US005969970A

United States Patent [19]

Rhoades

[11] Patent Number: 5,969,970

[45] Date of Patent: Oct. 19, 1999

[54] SAFETY INTERLOCK FOR USE IN HANDLING HAZARDOUS MATERIALS

[75] Inventor: Bruce J. Rhoades, Douglassville, Pa.

[73] Assignee: Lucent Technologies, Inc., Murray Hill, N.J.

[21] Appl. No.: 08/964,297

[22] Filed: Nov. 4, 1997

[51] Int. Cl.[6] .............................. G06F 19/00; G06G 7/66

[52] U.S. Cl. ............... 364/468.02; 364/400; 364/478.01; 364/528.01; 364/528.02; 364/528.03

[58] Field of Search ......................... 364/478.01, 478.02, 364/478.03, 478.04, 478.05, 478.06, 478.08, 478.09, 478.11, 478.12, 478.13, 478.14, 478.15, 479.01, 400, 479.02, 528.01, 528.03; 222/129; 414/287, 288, 332

[56] References Cited

U.S. PATENT DOCUMENTS 4,811,844 3/1989 Moulding, Jr. et al. ................ 206/459
5,057,677 10/1991 Bertagna et al. ....................... 364/404
5,603,430 2/1997 Loehrke et al. ............................ 222/1

*Primary Examiner*—William Grant
*Assistant Examiner*—McDieunel Marc

[57] ABSTRACT

A chemical storage facility, dispensing area, or equivalent unit is provided with a safety interlock device which automatically regulates access to the inlet used to introduce materials into the unit responsive to markings provided on the containers which hold such materials. In connection with the handling of potentially hazardous chemicals, such regulation is performed responsive to information provided on labeling associated with the bottles which contain the chemicals to be used. A bar code scanner is used to read bar-coded information provided on the labels affixed to the bottles, and the access door of the chemical storage facility or dispensing area is released, allowing the door to be opened, only in cases where the bar-coded information read by the scanner is found to correspond with the proper chemical to be dispensed. If the bar-coded information read by the scanner is found to correspond with some other (incorrect) chemical, the access door remains locked to prevent the incorrect chemical from being dispensed.

16 Claims, 1 Drawing Sheet

SAFETY INTERLOCK FOR USE IN HANDLING HAZARDOUS MATERIALS

TECHNICAL FIELD

The present invention generally relates to the dispensing of materials in various applications, and is primarily directed to the dispensing of potentially hazardous materials in a chemical storage facility or dispensing area.

BACKGROUND OF THE INVENTION

In any of a variety of applications, it is important for materials to be dispensed in correct type, in proper combination, in proper order, etc., to ensure that a proper result is achieved. As an example, and in the context of chemical storage and dispensing, it is often important for a chemical or a group of chemicals used in a particular process to be dispensed in regulated fashion. This can include assurances that a correct type of chemical is dispensed, that a desired combination of chemicals is dispensed, possibly in a particular order, that a particular chemical or combination of chemicals is not dispensed, or to ensure or protect against any of a number of possible variations associated with a particular chemical processing operation.

While similar problems are found in any of a number of applications, the improvements of the present invention are primarily directed to the loading of chemicals into a desired processing unit. In this context, it is common practice to introduce a chemical (or different chemicals) into the processing unit through an access port or door which is sized and configured to receive the container (e.g., a vessel or bottle) which holds the chemical to be dispensed. When it becomes appropriate to dispense a particular chemical (or chemicals), the container is introduced into the processing unit, through the door, for the discharge of its contents. In many instances, the container will be pressurized to facilitate in the discharge of its contents.Recognizing the need to carefully control such chemical dispensing, steps have been taken to develop systems for regulating the processes which are used to dispense such materials. Various types of labeling have been used to better inform the handler of such materials of the particular identity, use, and any contra-indications which may be pertinent to such materials. This can include any of a number of special markings or color coding for prompting or warning against a particular use or combination. However, irrespective of the labeling which is used, such markings remain subject to being misread, or other human error.

For this reason, attempts have been made to automate such regulation of the dispensing process to provide further assurances of a correct, and safe result. As an example, the bottles for containing the materials to be dispensed have been provided with special shapes and/or sizes for "keying" such vessels to the dispensing apparatus with which the materials they contain are to be used. This can include variations in the size and/or shape of the bottle itself, or more commonly, special sizing and/or shaping of the neck, spout, etc., associated with the bottle. By correspondingly sizing and/or shaping the inlet or port for accessing the processing unit, the dispensing of materials can be automatically limited to those materials which are contained in the corresponding vessel, achieving an appropriate level of assurance.

However, such keying requires the use of special vessels, and special ports for receiving such vessels, which can limit the overall use of such systems. This also fails to effectively accommodate applications which call for changing operating conditions or requirements, or combinations of processes, conditions or requirements which require careful control. As an example, let it be assumed that in a particular process, either of two different chemicals need to be introduced at a given point, but that introduction of the wrong chemical at the wrong time, or in the wrong order, will lead to a hazardous condition. Keying each of the vessels containing the two different chemicals to the intended (same) access port would provide no assurances that the chemicals are introduced at the correct time or in the desired order. The use of different keys, to ensure that the two different chemicals are correctly dispensed, would then prevent both of the vessels from being introduced through the same (keyed) port. Other systems attempted for similar purposes have in practice been found to be similarly limited.

SUMMARY OF THE INVENTION

In accordance with the present invention, the foregoing disadvantages are overcome by providing a chemical storage facility, dispensing area, or equivalent unit with a safety interlock device which automatically regulates access to the inlet for introducing materials into the unit responsive to markings provided on the containers which hold such materials.

In a preferred embodiment, the introduction of potentially hazardous chemicals into a chemical storage facility or dispensing area is regulated responsive to information provided on labeling associated with the bottles which contain the chemicals to be used. To this end, a bar code scanner is used to read bar-coded information provided on the labels affixed to the bottles. The access door of the chemical storage facility or dispensing area is released, allowing the door to be opened, only in cases where the bar-coded information read by the scanner is found to correspond with the proper chemical to be dispensed. If the bar-coded information read by the scanner is found to correspond with some other (incorrect) chemical, the access door will remain locked to prevent the incorrect chemical from being dispensed.

BRIEF DESCRIPTION OF THE DRAWINGS

The invention is best understood from the following detailed description when read in connection with the accompanying drawings. It is emphasized that, according to common practice, the various features of the drawings are not drawn to scale. On the contrary, the dimensions of the various features are arbitrarily expanded or reduced for clarity. Included in the drawings are the following Figures.

DETAILED DESCRIPTION OF PREFERRED EMBODIMENTS

Figure 1:
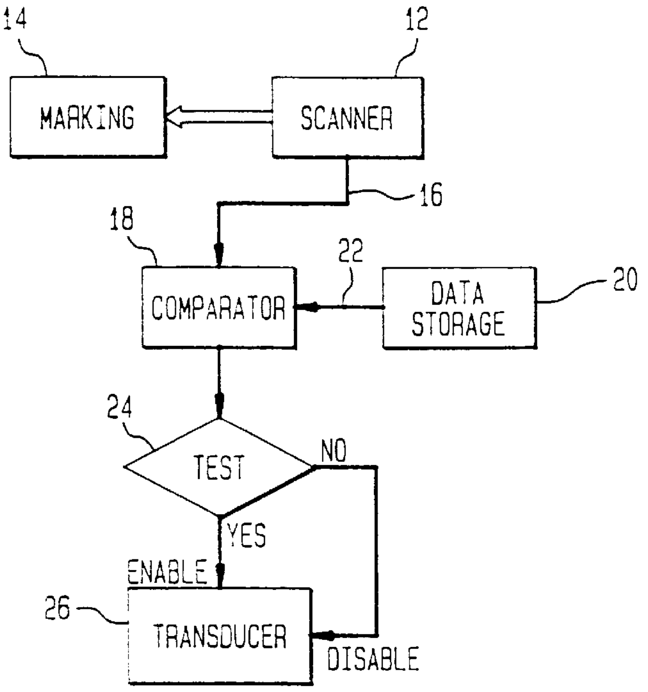
FIG. 1 is a block diagram illustrating operations of the safety interlock system of the present invention.

FIG. 1 generally illustrates the operation of an interlock system 10 which is produced in accordance with the present invention. The system 10 includes a scanner 12 for addressing a selected marking 14 defining a desired characteristic. The scanner 12 will be matched in type and configuration to the marking 14, for purposes of determining whether the addressed marking is a desired marking corresponding to a material which is properly dispensed, or a marking corresponding to some other material, which is not to be dispensed.

As an example, and in the context of chemical handling, the marking 14 can be associated with a label affixed to a chemical-containing vessel. This can include a coded marking, such as a bar code or equivalent, or wording identifying the contents of the vessel. This can also include physical features provided on the vessel, such as protrusions, detents or depressions, or embossed markings (including wording). Any of a variety of markings may be used for such purposes, provided the selected marking 14 (or plural markings) is capable of being detected by the scanner 12 for purposes of distinguishing between the contents of different vessels.

The scanner 12 will be suitably matched to the markings 14 which are selected for use in a particular application. For example, a bar code reader can be used in conjunction with a bar-coded label. An optical character recognition system can be used in conjunction with a printed label. Suitable mechanical devices can be used in conjunction with physical markings such as protrusions, detents, depressions or the like. Any of a variety of known devices can be used for purposes of implementing such systems.

Irrespective of the markings 14 employed, and the corresponding scanner 12 which is used, data 16 derived by the scanner 12 is then applied to a comparator 18. The comparator 18 additionally communicates with a data storage device 20 containing data 22 corresponding to the materials which are to be dispensed, desired combinations of materials which are to be dispensed, the order in which materials are to be dispensed, or other parameters or combinations of parameters which are to be regulated. The comparator 18 then operates to compare the data 16 received from the scanner 12 with the stored data 22, and a test is made, at 24, to determine whether or not the data 16 and the data 22 correspond, in turn indicating whether or not the vessel bearing the markings 14 contains a material which is properly dispensed.

Figure 2:
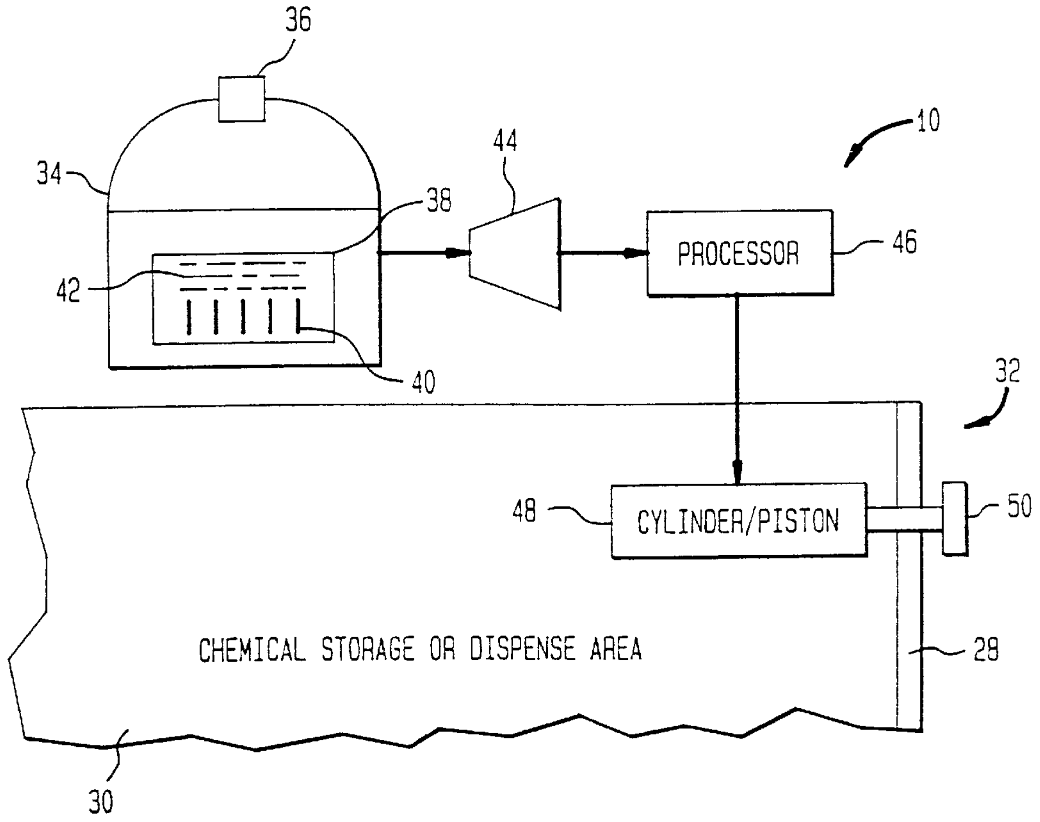
FIG. 2 is a schematic illustration of an interlock system of the present invention coupled with the access door of a chemical processing station.

Test 24 communicates with a transducer 26 for regulating access to a desired area, as will be discussed more fully below. As an example, and in the context of chemical handling, the transducer 26 can be associated with the access door 28 of a chemical processing station 30, as is shown in FIG. 2 of the drawings. Alternatively, the transducer 26 may be associated with other portions of other systems, for handling chemical materials, or for handling other materials calling for regulation in terms of their use.

FIG. 2 shows an implementation of the interlock system 10 of FIG. 1 in conjunction with a dispensing area 32 (or storage facility) associated with a processing station 30. In this embodiment, the materials (i.e., chemicals) to be introduced into the processing station 30 (i.e., to be dispensed) are contained in bottles 34. Each bottle 34 includes a spout 36 for discharging the contents of the bottle 34 and a label 38 which bears markings for identifying or otherwise describing the contents of the bottle 34. These markings include a bar code 40 of otherwise conventional type, for identifying the contents of each bottle 34, and text 42 for describing the contents of the bottle 34, or otherwise disclosing information associated with the contents of the bottle 34.

A scanner 44 (i.e., a bar code scanner of known configuration) is positioned to appropriately address the bar code 40 provided on the label 38. This can be done by having an operator manually present the label 38 to the scanner 44 so that the bar code 40 can be scanned and interpreted. As an alternative, the bottle 34 can be automatically passed to the scanner 44 so that the bar code 40 can be scanned and interpreted. In any event, the information represented by the bar code 40 is then converted to data (the data 16) for further processing, at 46 (using the comparator 18, the data storage device 20 and the test 24, as previously described).

If it is determined that the data derived from the bar code 40 corresponds to the data stored in the processor 46, access to the dispensing area 32 is enabled. To this end, the processor 46 communicates with a cylinder (piston) 48 having a latch mechanism 50 for interacting with the access door 28 which encloses the dispensing area 32 (i.e., the transducer 26 of FIG. 1). In this mode, the cylinder 48 operates the latch mechanism 50 so that the access door 28 is free to open. The bottle 34 containing the appropriate material (chemical) can then be introduced into the dispensing area 32, for the discharge of its contents into the processing station 30. If it is determined that the data derived from the bar code 40 does not correspond to the data stored in the processor 46, access to the dispensing area 32 is denied. In this mode, the cylinder 48 operates to place the latch mechanism 50 over the access door 28, preventing the access door 28 from being opened and in this way preventing the contents of the bottle 34 from being introduced into the dispensing area 32.

It should be understood that various changes in the details, materials and arrangement of parts which have been herein described and illustrated in order to explain the nature of this invention may be made by those skilled in the art within the principle and scope of the invention as expressed in the claims which follow. For example, in the embodiment of FIG. 2, a bar code scanner 44 is used to read a bar code 40 provided on the label 38. It would also be possible to provide a scanner (in substitution for the scanner 44) having optical character recognition equipment for addressing the text markings 42 provided on the label 38 to achieve an equivalent result. Any of a variety of different markings, and scanners for interpreting such markings, may be used to selectively regulate access to any of a number of different systems or devices where access is to be limited for purposes of safety, or for other purposes which might prove to be desirable for a particular application. By modifying the data 22 contained in the storage device 20, any of a variety of operations or regulating protocols may be developed. This can include determinations of whether or not a particular material is to be used, and whether a particular combination of materials is to be used. Combinations of materials may be drawn from vessels having similar or different configurations since the vessels are distinguished by the markings they bear and not the specifics of their configuration. Moreover, the combinations of materials which are drawn from the vessels can be regulated not only in terms of their identity, but also in terms of the order in which such materials are introduced into the system. This latter capability is important in cases where the mixing of otherwise correct materials in the wrong order can lead to a hazardous result. Other uses will occur to the skilled artisan, in association with chemical facilities, semiconductor equipment, or in other applications or industries, and may be associated with individual pieces of equipment or as part of a larger facility including multiple pieces of equipment, as desired.

What is claimed:

1. In a chemical processing apparatus, in which chemicals in a storage or dispensing area are dispensed therefrom into a chemical process, a method for delivering into the storage or dispensing area a material for use in such process from a container which holds the material, wherein the container includes a marking which identifies the material held by the container, the method which comprises the steps of:

scanning the marking and deriving a signal corresponding to the marking;

comparing the derived signal with a stored signal corresponding to a material to be delivered to the storage or dispensing area; and regulating the delivery of the material from the container to the storage or dispensing area responsive to the compared signals, wherein the regulating permits the material to be delivered and dispensed when the derived signal corresponds to the stored signal and prevents the material from being delivered into the area when the derived signal does not correspond to the stored signal.

2. The method of claim 1 wherein the scanning includes the step of reading a marking on a label applied to the container.

3. The method of claim 2 wherein the scanning includes the reading of a bar code applied to the label.

4. The method of claim 2 wherein the scanning includes the reading of text material applied to the label.

5. The method of claim 4 wherein the reading includes optical character recognition.

6. The method of claim 1 wherein the scanning includes the step of detecting a physical feature associated with the container.

7. The method of claim 1 wherein the method further includes the step of dispensing the chemical material into the chemical processing apparatus following the comparing and the regulating steps.

8. The method of claim 1 wherein the stored signal includes data corresponding to a designated type of material, for comparison with the derived signal, and which further includes the step of identifying the type of material held by the container.

9. The method of claim 8 wherein the data corresponds to the derived signals for a plurality of different materials, and which further includes the step of identifying which of the plurality of different materials is held by the container.

10. The method of claim 9 wherein the data farther includes timing information for indicating when in a predetermined cycle one of the plurality of different materials is to be dispensed, and which further includes the steps of identifying which of the plurality of different materials is held by the container, and determining whether the identified one of the plurality of materials is to be dispensed as part of the predetermined cycle.

11. The method of claim 1 wherein the dispensing is associated with a chemical dispensing area of a chemical processing apparatus, wherein the chemical dispensing area includes an access door, and which further includes the steps of inserting the container through the access door of the chemical dispensing area and dispensing the material from the container into the chemical processing apparatus.

12. The method of claim 11 wherein the chemical dispensing area includes a locking mechanism associated with the access door, and which further includes the step of releasing the locking mechanism responsive to the comparing step when the compared signals correspond to each other.

13. The method of claim 1 wherein the regulating further includes the step of operating a transducer coupled with a dispensing apparatus to permit the container to access the dispensing apparatus.

14. The method of claim 13 which further includes the step of opening an access door associated with the dispensing apparatus, responsive to operating the transducer.

15. The method of claim 14 which further includes the steps of inserting the container through the access door and dispensing the material from the container.

16. The method of claim 1 which further includes the step of dispensing the material from the container responsive to the regulating step.

* * * * *